United States Patent

Fiedler et al.

(10) Patent No.: US 9,695,838 B2
(45) Date of Patent: Jul. 4, 2017

(54) RADIAL COMPRESSOR FOR AN EXHAUST GAS TURBOCHARGER

(71) Applicant: Bosch Mahle Turbo Systems GmbH & Co. KG, Stuttgart (DE)

(72) Inventors: Max Fiedler, Kornwestheim (DE); Urs Hanig, Stuttgart (DE); Fabian Haslinger, Mannheim (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 729 days.

(21) Appl. No.: 14/038,207

(22) Filed: Sep. 26, 2013

(65) Prior Publication Data

US 2014/0169958 A1  Jun. 19, 2014

(30) Foreign Application Priority Data

Sep. 26, 2012  (DE) .................. 10 2012 217 381

(51) Int. Cl.
*F04D 29/62* (2006.01)
*F04D 25/02* (2006.01)
(Continued)

(52) U.S. Cl.
CPC ........... *F04D 29/622* (2013.01); *F01D 9/026* (2013.01); *F01D 25/24* (2013.01); *F02C 6/12* (2013.01);
(Continued)

(58) Field of Classification Search
CPC ...... F04D 29/08; F04D 29/083; F04D 29/086; F04D 29/42; F04D 29/422;
(Continued)

(56) References Cited

U.S. PATENT DOCUMENTS 3,150,650 A * 9/1964 Dreesen ............... F01D 17/143
                                                      123/559.1
5,427,498 A   6/1995 Lehe et al.
(Continued)

FOREIGN PATENT DOCUMENTS

DE         4213047 A1    10/1993
DE       10107807 C1     7/2002
(Continued)

OTHER PUBLICATIONS

English abstract for DE-4213047.
(Continued)

*Primary Examiner* — Dwayne J White
*Assistant Examiner* — Su Htay
(74) *Attorney, Agent, or Firm* — Fishman Stewart PLLC

(57) ABSTRACT

The invention relates to a radial compressor (1) for an exhaust gas turbocharger, in particular of an internal combustion engine,
 with a compressor housing (2) comprising an axial inlet channel (3) and a radial outlet channel (4),
 with a compressor wheel (6) for delivering and compressing a gas, wherein the compressor wheel (6) has an axial inlet side (7) facing the inlet channel (3), a radial outlet side (8) facing the outlet channel (4) and an axial wheel surface contour (9), which extends from the inlet side (6) as far as to the outlet side (7),
 with an adapter element (10) which is substantially designed sleeve-like, which can be axially introduced into a fastening section (11) provided on the compressor housing (2),
 wherein the adapter element (10) at least in sections has a surface contour (13), which is designed substantially complementarily to the axial wheel surface contour (9), so that by axially moving the adapter element (10) in
(Continued)

the fastening section (11) a gap width (w) of a passage gap (14) axially formed between the adapter element (10) and the compressor wheel (6) along the surface contours (9, 13) facing one another can be adjusted.

13 Claims, 1 Drawing Sheet

(51) Int. Cl.
    *F02C 6/12*     (2006.01)
    *F04D 29/42*     (2006.01)
    *F01D 9/02*     (2006.01)
    *F01D 25/24*     (2006.01)

(52) U.S. Cl.
    CPC ....... F04D 25/024 (2013.01); F04D 29/4213 (2013.01); *F05D 2220/40* (2013.01); *F05D 2260/30* (2013.01); *Y10T 29/49243* (2015.01)

(58) Field of Classification Search
    CPC .. F04D 29/4286; F04D 29/4293; F04D 29/62; F04D 29/622; F04D 29/624; F04D 29/628
    USPC .... 415/126, 127, 128, 173.4, 196, 197, 200, 415/206, 213.1, 214.1, 215.1, 217.1, 222, 415/223, 227
    See application file for complete search history.

(56)     References Cited

U.S. PATENT DOCUMENTS

| | | | | |
|---|---|---|---|---|
| 5,785,493 A | * | 7/1998 | Ojima | F01D 11/122 415/173.1 |
| 5,961,281 A | * | 10/1999 | Ojima | F01D 11/122 415/173.1 |
| 5,980,203 A | * | 11/1999 | Zatorski | C23C 4/02 415/173.4 |
| 6,193,463 B1 | * | 2/2001 | Adeff | F04D 29/023 415/196 |
| 6,234,749 B1 | * | 5/2001 | Hasegawa | F01D 11/122 415/122.1 |
| 7,014,418 B1 | * | 3/2006 | Arnold | F01D 1/22 415/100 |
| 7,306,427 B2 | * | 12/2007 | Ahlroth | F04D 29/622 415/173.1 |
| 2002/0114693 A1 | | 8/2002 | Bartholoma et al. | |
| 2011/0217162 A1 | * | 9/2011 | Dillon | F04D 29/4206 415/207 |

FOREIGN PATENT DOCUMENTS

| | | |
|---|---|---|
| JP | 06272698 | 9/1994 |
| JP | 10196380 | 7/1998 |
| JP | 2003120591 A | 4/2003 |
| JP | 2008031877 A | 2/2008 |

OTHER PUBLICATIONS

English abstract for JP-2003120591.
English abstract for JP-2008031877.
English abstract for JP-06272698.
English abstract for JP-10196380.
German Search Report for DE102012217381.1.

* cited by examiner

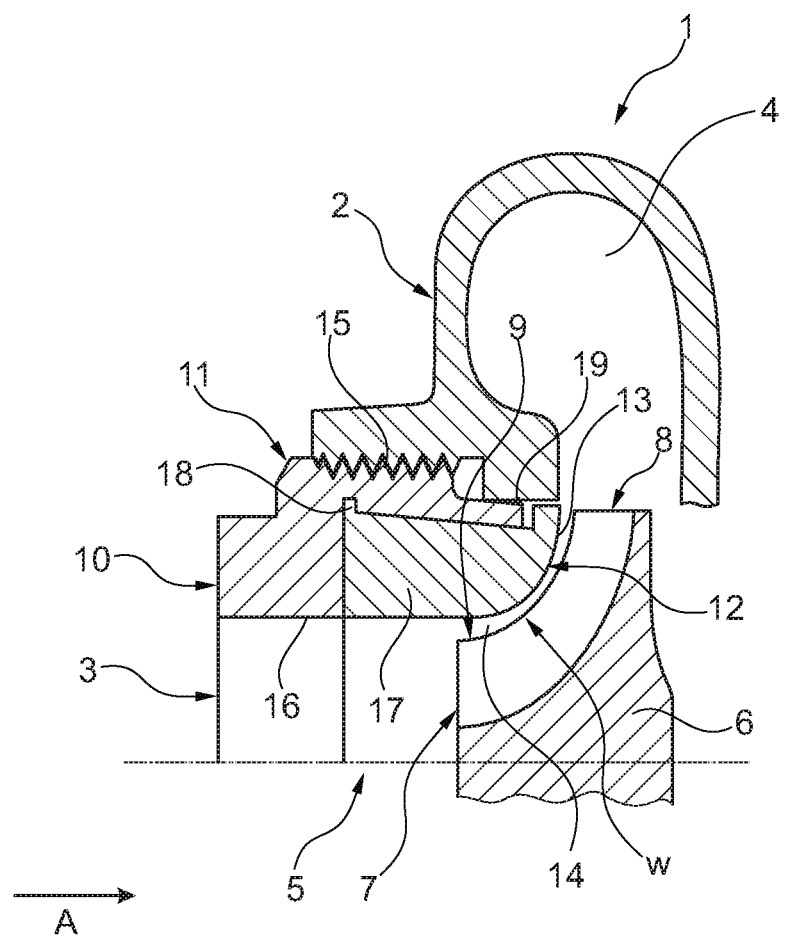

RADIAL COMPRESSOR FOR AN EXHAUST GAS TURBOCHARGER

CROSS-REFERENCE TO RELATED APPLICATIONS

This application claims priority to German Patent Application 10 2012 217 381.1 filed Sep. 26, 2012, which is hereby incorporated by reference in its entirety.

TECHNICAL FIELD

The present invention relates to a radial compressor for an exhaust gas turbocharger, in particular of an internal combustion engine, and to an exhaust gas turbocharger having such a radial compressor. The invention furthermore relates to a method for producing such a radial compressor.

BACKGROUND

Exhaust gas turbochargers are used for example in internal combustion engines in order to increase the pressure level in the fresh gas during the gas exchange process. Such an exhaust gas turbocharger can be equipped with a radial compressor, comprising a compressor wheel, by means of which the respective gas can be delivered and compressed. For this purpose, the compressor wheel can comprise an axial inlet side and a radial outlet side and be arranged in a compressor space. An inlet channel leads to the inlet side of the compressor wheel and in the case of an internal combustion engine to a low-pressure region of a fresh gas system equipped with the exhaust gas turbocharger. An outlet channel leads from the outlet side of the compressor wheel away to the high-pressure side of the fresh gas system.

In order to ensure a smooth and in particular frictionless rotary movement of the compressor wheel during the operation in the exhaust gas turbocharger, an intermediate space in the manner of a gap has to remain between the compressor wheel and a compressor housing forming the compressor space so that compressor wheel and compressor housing are arranged spaced from one another and consequently no interfering friction effects between these components can occur. However, a gap which is designed too large, i.e. a gap width of such a gap that is too large leads to an undesirable weakening of the performance of the exhaust gas turbocharger using the compressor wheel since such a gap leads to a reduction of the rate of delivery of the compressor wheel.

In order to ensure an optimal functionality with a maximum rate of delivery of the exhaust gas turbocharger the gap between compressor wheel and compressor housing that was explained beforehand is required on the one hand, but on the other hand, this gap should have as small as possible a gap width.

SUMMARY

It is an object of the present invention to state an improved embodiment for a radial compressor which is optimised in particular with respect to a compressor output. It is also an object of the present invention to state a method for producing such a radial compressor.

The abovementioned objects are solved through the subject of the independent patent claims. Preferred embodiments are subject of the dependent claims.

The invention is based on the general idea of providing an adapter element on a radial compressor, which in the axial direction of the compressor wheel has a surface contour, which is designed substantially complementarily to the axial wheel surface contour of the compressor wheel. According to the invention, this adapter element can be inserted in a fastening section provided in the region of the axial inlet channel of the radial compressor and fixed in said fastening section in a predetermined axial fixing position.

By moving the adapter element in the fastening section along the axial direction, a gap width of a gap between the adapter element and the compressor wheel can be adjusted along the surface contours facing one another—i.e. the axial surface contour of the adapter element and the wheel surface contour of the compressor wheel. In this way, the gap width can be minimised by moving the adapter element into a certain target position. In this so-called fixing position, the adapter element can then be finally fixed in a suitable manner, wherein in the fixing position the gap width assumes the desired minimal value in such a manner that compressor wheel and adapter element just do not touch one another, so that know interfering friction effects occur during the rotation of the compressor wheel. By means of the radial compressor according to the invention, the gap widths of the gap between compressor wheel and adapter element can thus be minimised and consequently the rate of delivery of the exhaust gas turbocharger using the radial compressor greatly improved compared with conventional radial compressors with non-optimised gap width.

In a preferred embodiment, the adapter element can be fixed relative to the compressor housing in the axial fixing position, in particular by means of pressing or gluing. In this way, the adapter element can be fixed in the final axial fixing position, in which the gap has the desired minimal gap width, so that during practical operation of the exhaust gas turbocharger using the radial compressor according to the invention an undesirable shifting of the adapter element and connected with this an undesirable enlargement of the gap width or an undesirable touching of the two surface contours can be avoided.

In a preferred embodiment which can be technically realised particularly easily, the fastening section can comprise an internal thread and the adapter element an external thread which is complementary thereto, by means of which the adapter element can be moved in the axial direction relative to the fastening section. Alternatively to this, the fastening section with the adapter element can form a sliding fit by means of which the adapter element can be moved in the axial direction relative to the fastening section. Both alternatives can be technically realised easily, which results in a cost-effective radial compressor according to the invention. In a further variant, it can also be conceived that the fastening section forms a slot and key seat with the adapter element.

In a furthering embodiment, the adapter element can comprise a sleeve-like adapter element fastening section that is complementary to the fastening section of the compressor housing. In the axial direction towards the compressor wheel, this merges into an axial extension section, on which the surface contour that is complementary to the axial wheel surface contour of the compressor wheel is arranged. Such an extension section can be integrally formed on the adapter element so that the adapter element fastening section also forms a unit with the extension section. Alternatively to this, the adapter element fastening section however can also be formed as a separate component, which can be fastened to the fastening section of the adapter element by means of pressing or gluing.

In a particularly preferred embodiment, the adapter element or at least the axial extension section can be produced from a plastic material. Alternatively to this, the adapter element can also be produced from another material and can be coated with a plastic at least in the region of the axial extension section. In a further alternative, the adapter element can be designed as a hybrid component overmoulded with plastic.

Using a plastic material is particularly appropriate when the adapter element in the axial direction is moved towards the final fixing position while the compressor wheel is rotating. In this case, the compressor wheel, in particular its blades, act in the manner of a "milling cutter". This means that the adapter element can be moved towards the compressor wheel so far until the surface contours of compressor wheel and adapter element touch one another. In the case of a rotating compressor wheel, the extension section of the adapter element produced from the plastic material is then quasi "milled off", which leads to the desired minimising of the gap width of the gap. This also produces an optimal shape adaptation which eliminates all shape tolerances of the compressor wheel.

A further advantage of the use of plastic material consists in that plastic is a relatively "soft" material, so that an undesirable deformation of the compressor wheel, when it rotates and is brought in contact with the adapter element, can be largely excluded. Obviously, a plastic material can also be used for the adapter element when the compressor wheel does not rotate when inserting the adapter element in the fastening section.

In the event that the axial extension section is embodied as a separate component which first has to be mounted to the adapter element, a suitable sealing element (for example in the manner of an O-ring or similar) can be provided on the adapter element, which seals the axial extension section against the actual adapter element In a particularly preferred embodiment it can be conceived that between the compressor housing and the adapter element a sealing device for sealing the adapter element against the compressor housing is arranged. In this way, an undesirable air flow between inlet and outlet side through the—ideally minimised—gap between the adapter element and the compressor wheel can be avoided. In a furthering embodiment, which can be technically realised particularly easily, such a sealing device can be designed in the manner of a sealing ring or, alternatively thereto, as a liquid seal.

The invention also relates to an exhaust gas turbocharger with a radial compressor having one or a plurality of the features mentioned beforehand, wherein the exhaust gas turbocharger comprises a turbine wheel which is connected to the compressor wheel of the radial compressor by means of a rotor shaft in a rotationally fixed manner.

The invention furthermore relates to a method for producing the radial compressor explained beforehand. According to this method, a compressor housing comprising an axial inlet channel and a radial outlet channel is provided in a first step a). The compressor housing at least partially surrounds a compressor space. In the compressor space, a compressor wheel for delivering and compressing a gas is arranged, wherein the compressor wheel comprises an axial inlet side facing the inlet channel, a radial outlet side facing the outlet channel and an axial wheel surface contour, which extends from the inlet side as far as to the outlet side.

In a second step b), an adapter element which is substantially designed sleeve-like is provided, which can be axially inserted into a fastening section provided on the compressor housing in the region of the axial inlet. This adapter element can be fixed in the fastening section in a predetermined axial fixing position.

In a third step c), the adapter element is axial inserted into the fastening section as far as to the axial fixing position, in which the surface contour of the adapter element at least partially contacts the axial wheel surface contour of the compressor wheel.

In a final fourth step d), the adapter element is axially fixed to the compressor housing.

Inserting the adapter element according to step c) can either take place with rotating or with stationary compressor wheel.

Through the axial inserting of the adapter element according to step c), a gap width of the gap between the two surface contours of adapter element and compressor wheel which are complementary to one another can be initially minimised. This can go so far that the two surface contours of adapter element and compressor wheel are brought into contact with one another. Such a minimising of the gap width can take place with rotating compressor wheel: in this case, the compressor wheel performs machining work on the adapter element. This means that the surface contour of the adapter element through the rotation of the compressor wheel, which acts in the manner of a milling cutter, is adapted to the surface contour of the compressor wheel so that in the ideal case, no undesirable gap between compressor wheel and compressor housing is present any longer or such a gap has a minimal gap width.

Alternatively to this, inserting the adapter element according to step c) can also take place with stationary compressor wheel. In this case, the adapter element can be finally fixed in the compressor housing in the following step d), for example by means of gluing or pressing and the compressor wheel put into rotary motion only thereafter. In this case, too, the compressor wheel works in the manner of a milling cutter and thus optimises the surface contour of the adapter element in such a manner that the gap width of the gap between compressor wheel and compressor housing becomes minimal.

By means of the method according to the invention a minimal contour gap (so-called "zero gap") can thus be generated so that the surface contour of the adapter element "contacts" the surface structure of the compressor wheel that is complementary thereto quasi without touching, so that the rotation of the compressor wheel can take place without interfering friction effects between the adapter element and the compressor wheel.

Further important features and advantages of the invention are obtained from the subclaims, from the drawing and from the associated FIGURE description by means of the drawing.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description.

BRIEF DESCRIPTION OF THE DRAWINGS

The FIGURE shows a radial compressor according to the invention for an exhaust gas turbocharger and is designated 1. The radial compressor 1 comprises a compressor housing 2, which comprises an axial inlet channel 3 and a radial outlet channel 4. The compressor housing 2 partially surrounds a compressor space 5. In the compressor space 5, a compressor wheel 6 for delivering and compressing a gas is arranged. The compressor wheel 6 comprises an axial inlet side 7 facing the inlet channel 3 and a radial outlet 8 facing the outlet channel 4. An axial wheel surface contour 9 extends from the inlet side 7 to the outlet side 8.

DETAILED DESCRIPTION

The radial compressor 1 furthermore comprises an adapter element 10 which is substantially designed sleeve-like. The adapter element 10 can be inserted in an axial direction A into a fastening section 11 provided on the compressor housing 2 in the region of the axial inlet channel 3. On a first face end 12, which faces the compressor wheel 6, the adapter element 10 comprises a surface contour 13, which is substantially formed complementarily to the axial wheel surface contour 9.

By axially moving the adapter element 10 in the axial direction A in the fastening section 11 of the compressor housing 2 (in a non-fixed state of the adapter element 10) a gap width w of a passage gap 14 which is axially formed between the adapter element 10 and the compressor wheel 6 along the surface contours 9, 13 facing one another can be adjusted. Such adjusting in this case can take place in that the gap width w becomes as small as possible. To this end, the adapter element 10 is moved into an axial fixing position in which the two surface contours 9, 13 touch one another. In this way, forming an undesirable passage gap 14 between the two surface contours 9, 13 is almost completely avoided.

In the axial fixing position, the adapter element 10 can for example be finally fixed by means of gluing or pressing or another suitable fastening method. Before the final fixing, the compressor wheel 6 can be put into rotary motion and thus have a machining effect on the surface contour 13 of the adapter element 10. Thus it is ensured that the compressor wheel 6 during the practical operation of the guide blade arrangement 1 can be rotated in a frictionless manner. Through the final fixing of the adapter element 10 it is prevented that the latter during practical operation of the exhaust gas turbocharger using the radial compressor 1 according to the invention can be undesirably moved in the fastening section 11 so that under certain conditions an interfering passage gap 14 with an undesirably large gap width w can be formed again.

Inserting and moving the adapter element 10 in the fastening section 11 can basically take place with stationary or rotating compressor wheel 6. In the latter case, the compressor wheel 6 has a machining effect on the surface contour 13 of the adapter element 10 when it strikes the wheel surface contour 9 of the compressor wheel 6. However, alternatively to this, as has already been explained, the adapter element can be moved towards the compressor wheel 6 when it is stationary, in a following step, finally fixed in the final fixing position in which the two surface contours 9, 13 contact one another, for example by means of gluing or pressing (or another suitable fastening method) in the axial fixing position and following this the compressor wheel 6 put into rotary motion. In this case it must be ensured however that the contact pressure of the surface contour 13 onto the compressor wheel 6 is so strong that a rotation of the compressor wheel 6 is no longer possible.

The fastening section 11 of the compressor wheel 2 can comprise an internal thread and the adapter element 10 can comprise an external thread which is complementary thereto, by means of which the adapter element 10 can be moved in the axial direction A relative to the fastening section 11. Such an internal or external thread is roughly schematically indicated in FIG. 1 and provided with the reference number 15.

Alternatively to this, the fastening section 11 of the compressor housing 2 can also form a sliding fit with the adapter element 10. By means of such a sliding fit (not shown in FIG. 1), the adapter element 10 can be likewise moved relative to the fastening section 11 in the axial direction A.

The adapter element 10 can be formed in one part, or, as shown in FIG. 1, also in two parts. In this case, the adapter element 10 can comprise a sleeve-like adapter element fastening section 16 which is complementary to the fastening section 11 of the compressor housing 2, which in the axial direction A towards the compressor wheel 2 merges into an axial extension section 17, on which the surface contour 13 that is complementary to the axial wheel surface contour 9 of the compressor wheel 6 is arranged.

The axial extension section 17 can for example be fastened to the adapter element fastening section 16 by means of gluing. Between the two components, a sealing element 18 can be provided. The entire adapter element 10 or at least the axial extension section 17 can be produced from a plastic material, which, as explained beforehand, can be easily "machined" by the surface contour 9 of the rotating compressor wheel 6 when inserted in the fastening section 11 of the compressor housing 12.

Alternatively, it is also conceivable that in a variant the adapter element 10 is formed as a unit and completely or partially coated with a plastic material.

Between the compressor housing 2 and the adapter element 10 a sealing device 19 for sealing the adapter element 10 against the compressor housing 2 can be arranged. This sealing device 19 can be designed in the manner of a sealing ring or, alternatively thereto, also as a liquid seal.

The radial compressor 1 can be part of an exhaust gas turbocharger which is not shown in FIG. 1. Such an exhaust gas turbocharger can comprise a turbine wheel that is connected to the compressor wheel 6 of the radial compressor 1 in a rotationally fixed manner by means of a rotor shaft.

The invention claimed is:

1. A radial compressor for an exhaust gas turbocharger of an internal combustion engine comprising:
   a compressor housing including an axial inlet channel and a radial outlet channel, wherein the compressor housing at least partially surrounds a compressor space;
   a compressor wheel arranged in the compressor space for delivering and compressing a gas, wherein the compressor wheel includes an axial inlet side facing the inlet channel, a radial outlet side facing the outlet channel, and an axial wheel surface contour extending from the inlet side to the outlet side;
   an adapter element substantially designed sleeve-like, the adapter element axially insertable into a fastening section provided on the compressor housing proximate to the axial inlet channel and fixed in a predetermined axial fixing position; and
   wherein the adapter element having a first axial face end, which in the predetermined axial fixing position faces the compressor wheel, includes a surface contour at least in sections formed substantially complementarily to the axial wheel surface contour, wherein axially moving the adapter element in the fastening section in a non-fixed state of the adapter element adjust a gap width of a passage gap axially formed between the adapter element and the compressor wheel along the axial wheel and adapter element surface contours;

wherein the fastening section includes an internal thread and the adapter element includes an external thread that is complementary thereto, wherein the adapter element is moveable relative to the fastening section in the axial direction via the internal and external threads.

2. The radial compressor according to claim 1, wherein the adapter element is fixed relative to the compressor housing in the predetermined axial fixing position by at least one of pressing and gluing.

3. The radial compressor according to claim 1, wherein the adapter element includes a sleeve-like adapter element fastening section arranged complementary to the fastening section of the compressor housing, the sleeve-like adapter element fastening section merging in the axial direction towards the compressor wheel into an axial extension section on which the surface contour that is complementary to the axial wheel surface contour of the compressor wheel is arranged.

4. The radial compressor according to claim 3, wherein at least one of the adapter element and the axial extension section is produced of a plastic material.

5. The radial compressor according to claim 3, further comprising a seal between the axial extension section and the adapter element fastening section.

6. The radial compressor according to claim 1, further comprising a sealing device configured between the compressor housing and the adapter element for sealing the adapter element against the compressor housing.

7. The radial compressor according to claim 6, wherein the sealing device includes at least one of a sealing ring and a liquid seal.

8. The radial compressor according to claim 6, wherein the adapter element includes a sleeve-like adapter element fastening section arranged complementary to the fastening section of the compressor housing.

9. The radial compressor according to claim 1, wherein the compressor wheel is connectable to a turbine wheel in a rotationally fixed manner.

10. The radial compressor according to claim 1, wherein the adapter element is moveable from the non-fixed position to the predetermined axial fixing position.

11. A method for producing a radial compressor, the method comprising:

providing a compressor housing including an axial inlet channel and a radial outlet channel, the compressor housing at least partially surrounding a compressor space, and a compressor wheel arranged in the compressor space for delivering and compressing a gas, wherein the compressor wheel includes an axial inlet side facing the inlet channel, a radial outlet side facing the outlet channel, and an axial wheel surface contour extending from the inlet side to the outlet side;

providing an adapter element substantially designed sleeve-like, the adapter element axially insertable into a fastening section provided on the compressor housing proximate to the axial inlet channel, the adapter element fixable in a predetermined axial fixing position, the fastening section including an internal thread and the adapter element including an external thread that is complementary thereto;

inserting axially the adapter element into the fastening section to the predetermined axial fixing position via the internal and external threads, wherein the surface contour of the adapter element at least partially contacts the axial wheel surface contour of the compressor wheel, and fixing axially the adapter element to the compressor housing.

12. The method according to claim 11, wherein providing the adapter element takes place with a rotating compressor wheel.

13. The method according to claim 11, wherein providing the adapter element takes place with a stationary compressor wheel.

* * * * *